United States Patent
Hsiao et al.

(10) Patent No.: US 7,554,639 B2
(45) Date of Patent: Jun. 30, 2009

(54) METHOD TO CONTROL THE PRETILT ANGLE OF LIQUID CRYSTAL DEVICE

(75) Inventors: Ching-Wen Hsiao, Pan Chiao (TW); Bang-Hao Wu, Kao Hsiung (TW); Hsin-Chun Chiang, Hsin Chu (TW); Yu-Ming Chen, Hsin Chu (TW)

(73) Assignees: Taiwan TFT LCD Association, Hsinchu (TW); Chunghwa Picture Tubes, Ltd., Taoyuan (TW); Au Optronics Corp., Hsinchu (TW); Quanta Display Inc., Tao Yuan Shien (TW); Hannstar Display Corp., Taipei (TW); Chi Mei Optoelectronics Corp., Tainan County (TW); Industrial Technology Research Institute, Hsinchu (TW); Toppoly Optoelectronics Corp., Miao-Li County (TW)

( * ) Notice: Subject to any disclaimer, the term of this patent is extended or adjusted under 35 U.S.C. 154(b) by 270 days.

(21) Appl. No.: 11/520,679

(22) Filed: Sep. 14, 2006

(65) Prior Publication Data

US 2007/0263151 A1     Nov. 15, 2007

(30) Foreign Application Priority Data

May 12, 2006   (TW) .............................. 95117020 A

(51) Int. Cl.
G02F 1/1337   (2006.01)
(52) U.S. Cl. ..................................... 349/130
(58) Field of Classification Search .................. 349/130
See application file for complete search history.

(56) References Cited

U.S. PATENT DOCUMENTS

| | | | |
|---|---|---|---|
| 5,579,141 A | 11/1996 | Suzuki et al. | |
| 5,604,615 A | 2/1997 | Iwagoe et al. | |
| 5,623,354 A | 4/1997 | Lien et al. | |
| 5,629,056 A | 5/1997 | Koike et al. | |
| 5,697,192 A | 12/1997 | Inoue et al. | |
| 5,710,608 A | 1/1998 | Nakabayashi et al. | |
| 5,711,999 A | 1/1998 | Yamada et al. | |
| 5,764,326 A | 6/1998 | Hasegawa et al. | |
| 5,855,968 A | 1/1999 | Hirata et al. | |
| 6,067,141 A * | 5/2000 | Yamada et al. | 349/129 |
| 6,115,098 A * | 9/2000 | Kume et al. | 349/156 |
| 6,124,914 A | 9/2000 | Chaudhari et al. | |
| 6,246,458 B1 * | 6/2001 | Koma et al. | 349/124 |
| 6,519,018 B1 * | 2/2003 | Samant et al. | 349/130 |
| 6,630,975 B1 * | 10/2003 | Terashita | 349/139 |
| 6,724,449 B1 * | 4/2004 | Andry et al. | 349/124 |

(Continued)

*Primary Examiner*—Frank G Font
*Assistant Examiner*—Mary A El Shammaa
(74) *Attorney, Agent, or Firm*—Rabin & Berdo, P.C.

(57) ABSTRACT

A method to control the pretilt angle of a liquid crystal device is disclosed. The claimed invention provides two substrates and at least one vertical alignment layers, which are fabricated on one side of each substrate and are opposite to each other. Moreover, a liquid crystal layer is sandwiched between the alignment layers, and the preferred embodiment of the liquid crystal device has an Optically Compensated Birefringence (OCB) configuration. More particularly, before the process of alignment for the liquid crystal device is performed, a pretilt angle disclosed in the present invention is adjusted since at least one vertical alignment layer is treated with a particle beam generated by plasma or ions. The pretilt angle can range between 5 and 85 degrees.

17 Claims, 9 Drawing Sheets

U.S. PATENT DOCUMENTS 6,852,374 B2      2/2005  Mizusaki et al.
7,227,606 B2 *    6/2007  Takeda et al. ............... 349/139

2004/0119924 A1 * 6/2004  Takeda et al. ............... 349/129

* cited by examiner

|  | Rubbing | Ion Beam+Rubbing | | | | |
|---|---|---|---|---|---|---|
|  | #1 | #2 | #3 | #4 | #5 | #6 |
| Beam Energy (eV) | 0 eV | 250 eV | 250 eV | 250 eV | 250 eV | 250 eV |
| Dosage |  | $2\times10^{13}$ | $3\times10^{13}$ | $3.5\times10^{13}$ | $4\times10^{13}$ | $5\times10^{13}$ |
| Incident angle |  | 89 | 89 | 89 | 89 | 89 |
| Pretilt angle | 84.5109 | 79.0144 | 71.4985 | 54.7536 | 47.5049 | 24.1674 |

FIG. 8

METHOD TO CONTROL THE PRETILT ANGLE OF LIQUID CRYSTAL DEVICE

BACKGROUND OF THE INVENTION

1. Field of the Invention

A method to control the pretilt angle of a liquid crystal device (LCD) is disclosed, more particular, the method utilizes a particle beam with plasma or ions to treat the surface of the vertical alignment layers of the LCD before the alignment process, so as to adjust the pretilt angle of the liquid crystal (LC) molecules.

2. Description of Related Art

Liquid crystal is often used for display screens since it has intrinsic photoelectric characteristics. Generally, productive flat-panel LCDs are TN (Twisted Nematic) types.

The basic structure of a TN LCD includes upper and lower conductive glass substrates, with a Nematic liquid crystal injected therebetween. Moreover, two polarized plates with orthogonal-polarization are disposed on the outside of each substrate. Next, an alignment film is coated on each conductive substrate and rubbed with rubbing clothes, so that the liquid crystal molecules are aligned in the rubbing direction. Under conditions in which an electric field isn't being used, the polarized direction of the ray will change as torsion occurs to the liquid crystal molecules after entering the LCD, thereby causing a bright state. Conversely, the liquid crystal molecules will be homeotropic, namely vertical to the direction of the alignment film, when an electric field is used, so as to form a dark state since the ray cannot pass through the second polarizer.

LCD is well-developed, but there are still several problems existing such as the viewing angle, contrast, and display uniformity. Particularly, the above-mentioned alignment film is relevant to implementing high-density and large-sized LCDs, as well as faster response times. Liquid crystal molecules of the LCD are used in displayers since the direction of the polarization of ray can be changed by an external electric field. Shutting off the electric field recovers the original arrangement via the recovering force, i.e. the anchoring force. Therefore, whether the ray passes through the device determines either a bright state or a dark state of the LCD.

There are three kinds of liquid crystal arrangements—homogeneous alignment, vertical alignment, and tilted-angle alignment. Reference is made to FIG. 1A showing the homogeneous alignment. The long-axes of the liquid crystal molecules 14 are parallel with the alignment film 12. The vertical alignment shown in FIG. 1B shows the long-axes of the liquid crystal molecules 16 being vertical to the alignment film 12. The tilted-angle alignment shown in FIG. 1C shows a schematic diagram of a pretilt angle formed between the liquid crystal molecules 18 and the surface of alignment film 12. The structure of pretilt angle is implemented to accomplish a uniform alignment. The pretilt angle is an important parameter affecting the LCD characteristics. Particularly, besides the pretilt angle being formed by the interactive force caused from the chemical structure between the liquid crystal and the alignment film, the morphology of the alignment film also affects the pretilt angle.

Conventional liquid crystal alignment method is rubbing. Reference is made to FIG. 2 showing a surface treatment method on alignment film. A substrate structure 2 is placed on a movable table 20, wherein a glass substrate 4 and an alignment film 6 are included, and rubbing cloth 22 covers the surface of a rolling wheel 24. As the table 20 moves the rolling wheel 24 drives the rubbing cloth 22 to induce surface anisotropy of the alignment film 6.

In the field of non-contact alignment, such as photo-alignment, a polarized UV ray is used to perform surface anisotropy on alignment film. Reference is made to U.S. Pat. No. 5,711,999 illustrating a method of applying light to produce surface anisotropy of a photosensitive alignment film. U.S. Pat. No. 5,711,999 has disclosed the range of light wavelength and the quantity of radiation, which react with the chemical components of the film. The characteristics of the alignment film are changed by controlling the intensity of exposure and the wavelength of the light. The pretilt angles of the LC molecules are changed thereby. Moreover, U.S. Pat. No. 5,623,354 has disclosed that an ultraviolet light can change the pretilt angle of the liquid crystal molecules on the alignment layer of the LCD. A display device with a multi-domain liquid crystal layer is thereby manufactured.

U.S. Pat. No. 6,852,374 has disclosed a LCD, an optical element, a method of fabricating the LCD, and a method of making an optical element. This patent relates to the structural design and a manufacturing method of a liquid crystal panel with optical compensation birefringence (OCB) mode.

For implementing the OCB structure mentioned above, the control of the pretilt angle (i.e. generally, larger than 5 degree but less than 85 degree) of the LC molecules is necessary. For controlling the pretilt angle, the above-mentioned patent uses the wavelength and the quantity of the light source to treat the surface on the alignment film. Since a particular material is used for the alignment film, only specific side-chain of the alignment film will be broken under a specific light wavelength, so as to change the pretilt angle of liquid crystal.

Reference is made to FIG. 3 of the conventional art. An alignment film material 31 includes a main chain structure 32 and a side chain structure 34. A photosensitive structure 33 is used to connect the main chain and the side chain. In general, a light of a specific wavelength corresponds with a specific photosensitive structure 33. When the light of a specific wavelength illuminates the photosensitive structure 33 featuring a specific wavelength, the photosensitive structure 33 is broken, thereby the pretilt angle of the LC molecules is controlled.

In a displaying mode with the optical compensation birefringence (OCB), a high pretilt angle of the liquid crystal molecules is required so that a step of converting a splay state into a bend state of the liquid crystal molecules by stressing an external high voltage can be ignored. However, in view of other conventional arts, if the step of alignment is solely achieved by rubbing, an ionic beam, light beams or plasma beams individually, the high pretilt angle required by OCB will not be reached.

Alternatively, although combining the vertical and horizontal polyimides of the conventional art allows the high pretilt angle to be reached, it requires particular solution mixture and the evaporation process to control the surface fraction of vertical and horizontal polyimides. Moreover, the step of treating the surface by a light or a heat source with assistance of the step of rubbing to produce high pretilt angle will cause a high residual DC voltage or a bad thermal stability.

Consequentially, the technology of the conventional art using light to treat the surface cannot generate the required characteristics of the alignment film precisely because the quantity of light is not easily controlled, so the surface of the alignment film is damaged after exposure. Specially designed alignment film cannot achieve a stable high pretilt angle and is not cost effective as well.

SUMMARY OF THE DISCLOSURE

In view of the drawbacks of the prior arts, the present invention provides a method of feasible control the high pretilt angle of liquid crystal molecules. The method uses a step of coating the vertical alignment film, and a step of treating the surface with particle beam and a rubbing step afterward to achieve a high pretilt angle of the LC molecules. The exchange for the sequence of surface treating step and the rubbing step can also produce the high LC pretilt angle. Since the pretilt angle of the LC molecules is relative to the side chains density of the alignment film's surface, the present invention uses the particle beam generated by plasma or ions to process the surface treatment of the alignment film of the LCD, so as to adjust the density of the side chains and to change the pretilt angle of the LC molecules.

The present invention differs from the prior art in that the prior art requires a blend of the vertical and horizontal alignment films to achieve a higher pretilt angle under specific conditions. The present invention merely requires a vertical alignment film and a surface treatment to control the density of the side chains of the alignment film's surface.

A preferred embodiment of the method of controlling the pretilt angle of the LC molecule is adopted on a liquid crystal panel with an optical compensation birefringence (OCB) mode. The steps thereof comprise: preparing a vertical alignment film on a substrate, such as the step of roller coating, scraper coating spin coating or inkjet printing, so as to form a vertical alignment film. Moreover, an inorganic vertical alignment film, such as fluorinated diamond-like carbon (F-DLC), can be made by the step of sputtering or plasma enhanced chemical vapor deposition (PECVD). Next, a particle beam generated by the plasma or ion beam performs a surface treatment on the surface of the vertical alignment film, and performs an alignment treatment thereon consequently. In conclusion, the side chain of the above vertical alignment film is changed by the particle beam generated by the plasma or ionic beam, so as to control the pretilt angle of the molecules.

The preferred embodiment of the aforementioned particle beam is generated by the ions or plasma. By means of controlling the energy, quantity, incident angle, or even the types of the particle beam, the density and distribution of the side chains of the vertical alignment film are changed, thereby controlling the pretilt angle of the LC molecules.

BRIEF DESCRIPTION OF DRAWINGS

The present invention will be readily understood by the following detailed description in conjunction with accompanying drawings, in which:

FIG. 8 is the experimental result of this invention under different extent of particle beam exposure.

DETAILED DESCRIPTION OF THE PREFERRED EMBODIMENTS

To understand the technology, means and functions adopted in the present invention further, reference is made to the following detailed description and attached drawings. The invention shall be readily understood deeply and concretely from the purpose, characteristics and specifications. Nevertheless, the present invention is not limited to the attached drawings and embodiments in the following description.

The present invention relates to a manufacturing method of a liquid crystal device, and the method for controlling a pretilt angle of the liquid crystal molecules thereof. In view of the connection between the LC pretilt angle and the density of the alignment film side chains thereof, an ionic beam generated by plasma or ions is used to treat the surface on the alignment film of the LCD, so as to adjust the density of the side chains. Thereby, the pretilt angle of the LC molecules can be changed. The present invention differs from the conventional art requiring a special combination of the vertical and horizontal alignment films to implement higher pretilt angle. In the present invention only the vertical alignment film including the material and solution thereof is used for the present invention. Furthermore a surface treatment and an alignment step are performed to implement the required density of the side chains and the surface anisotropy of the alignment film.

Figure 1A:
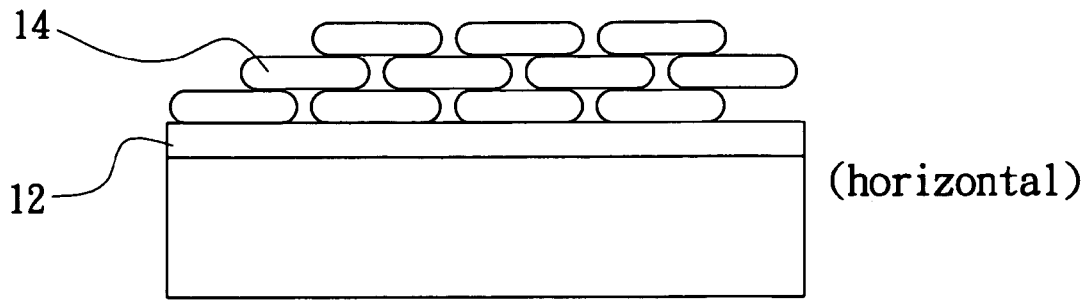
FIG. 1A is a horizontal alignment diagram of the liquid crystal molecules of the prior art.
Figure 1B:
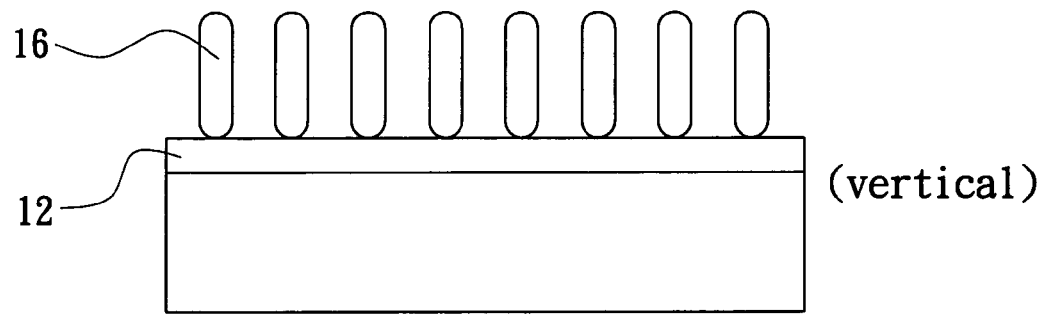
FIG. 1B is a vertical alignment diagram of the liquid crystal molecules of the prior art.
Figure 1C:
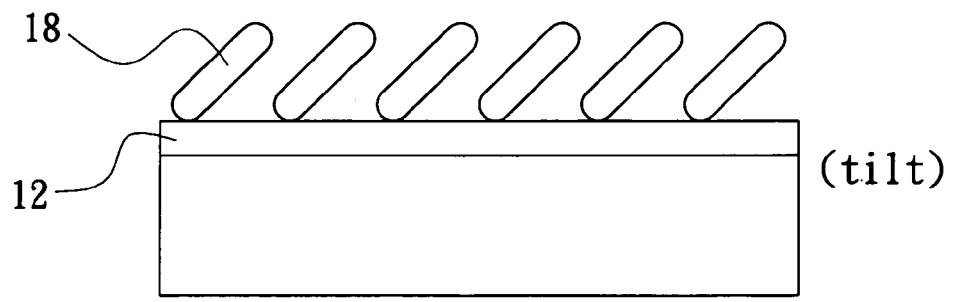
FIG. 1C is a tilt alignment diagram of the liquid crystal molecules of the prior art.
Figure 2:
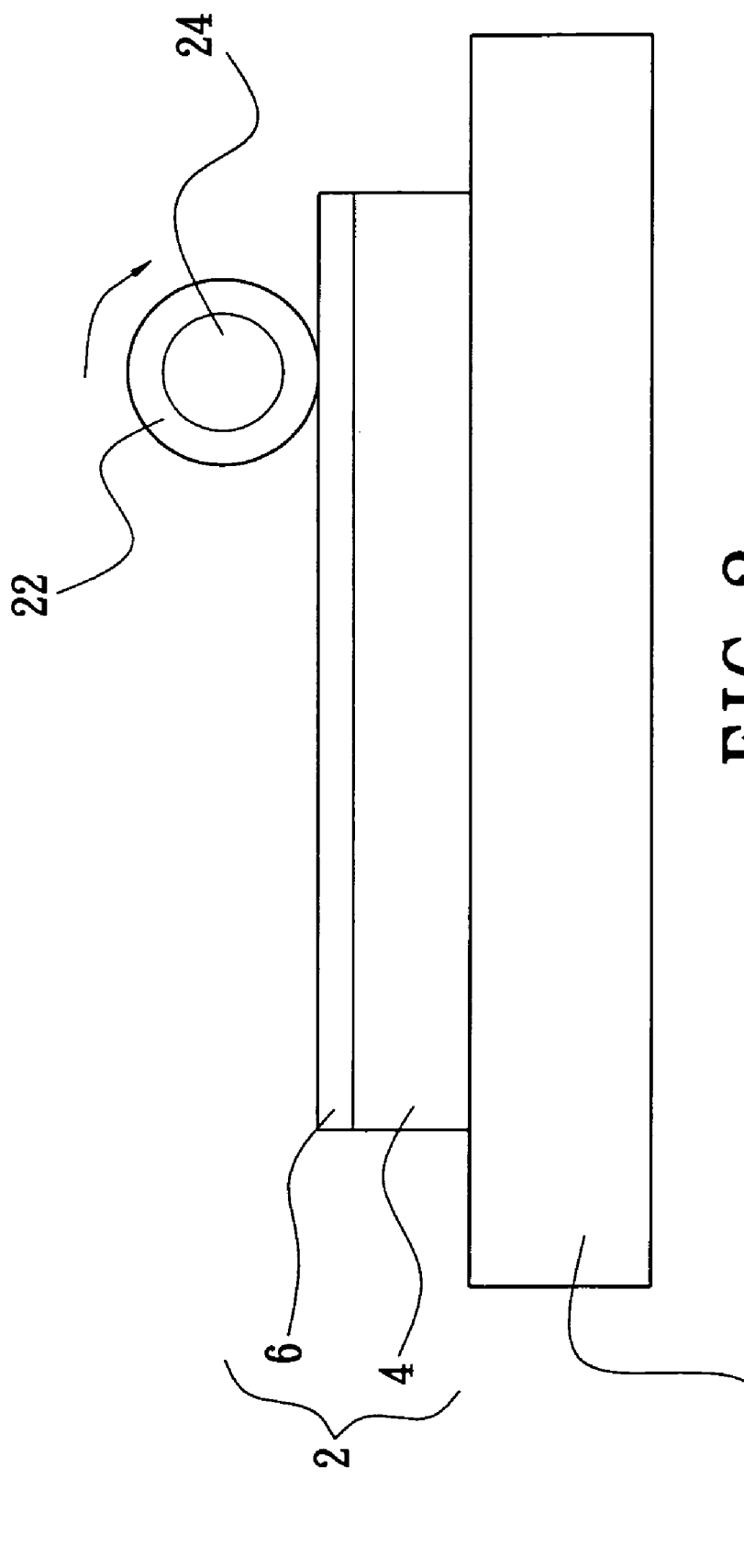
FIG. 2 shows the method of rubbing the surface of the alignment film of the prior art.
Figure 3:
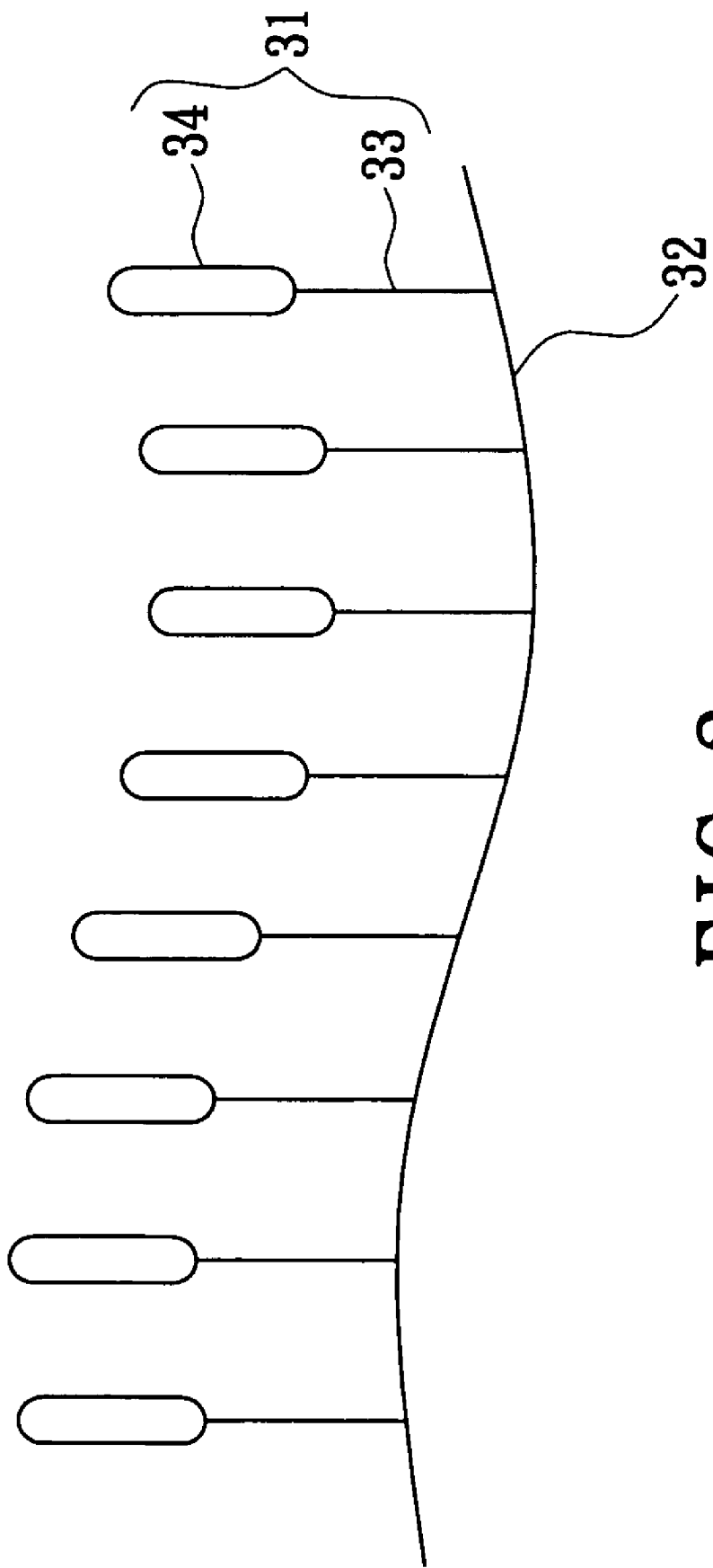
FIG. 3 shows the side chain structure of the surface of the alignment film of the prior art.
Figure 4A:
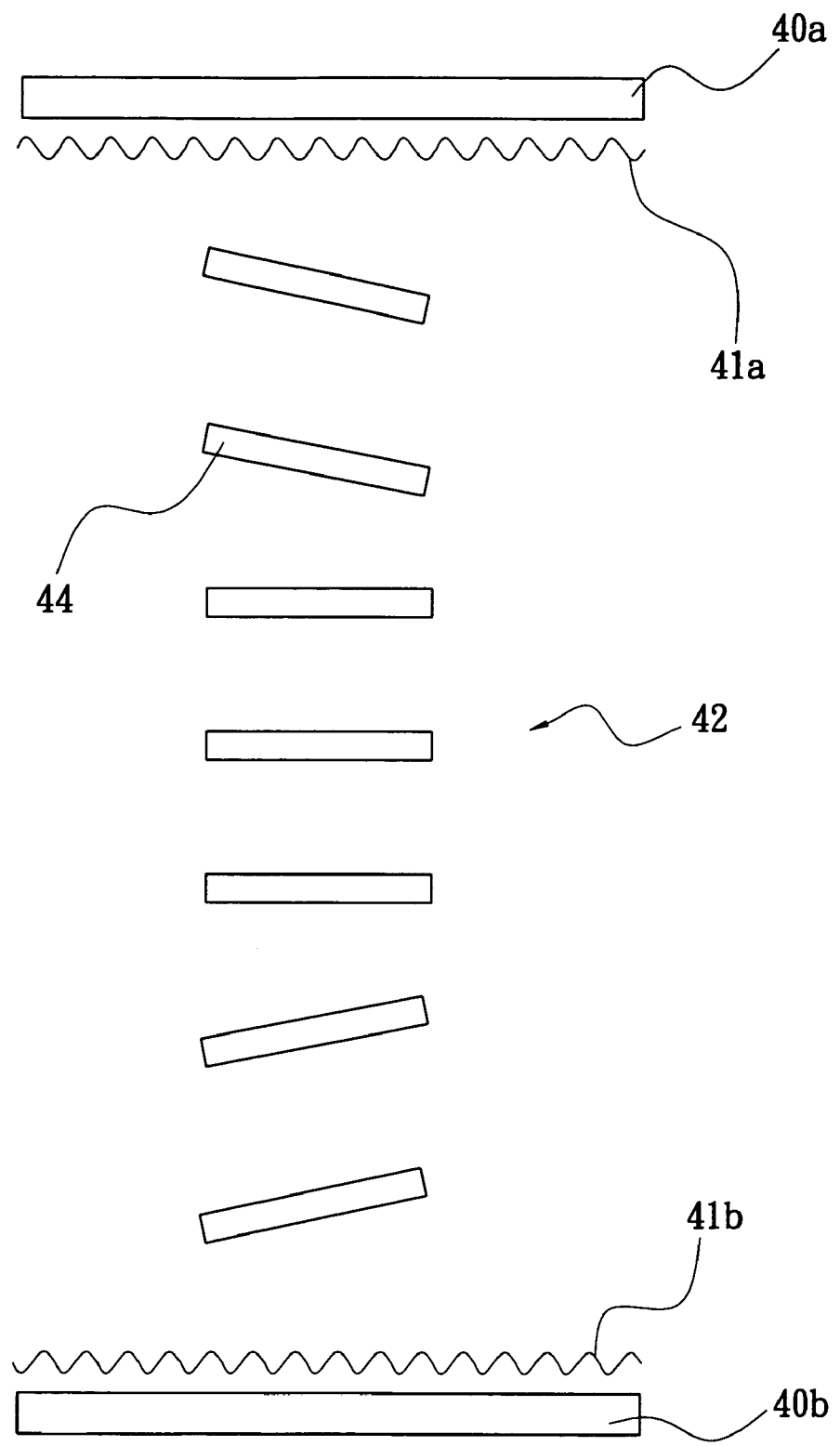
FIG. 4A and FIG. 4B show the liquid crystal device of the present invention with spaly and bend configuration, respectively.
Figure 4B:
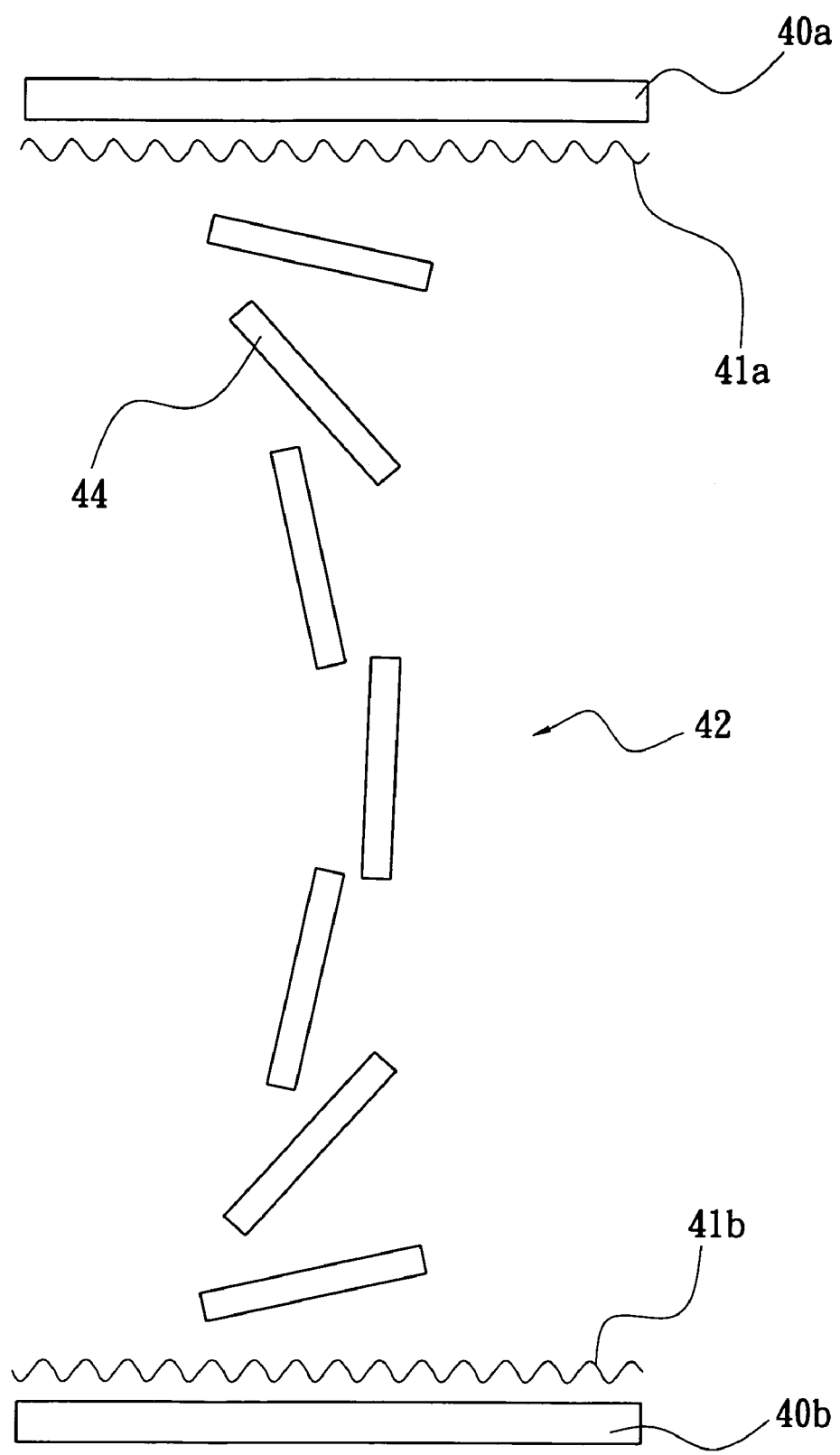

Reference is made to FIG. 4A illustrating the LCD with a splay configuration. The liquid crystal device includes a top substrate 40a, a bottom substrate 40b, a top alignment layer 41a, a bottom alignment layer 41b, a liquid crystal layer 42 and the liquid crystal molecules 44 sandwiched therebetween. The liquid crystal molecules in an initial state are aligned as a splay configuration since the molecules are affected by the top/bottom alignment layers 41a, 41b, and shown at a low pretilt angle. However, for achieving the fast response of the LCD, an extra voltage is required to transform the splay configuration to the bend configuration as shown in FIG. 4B, so the LC molecules 44 are changed to a high pretilt angle state. The method for controlling the pretilt angle of the LC molecules of the present invention controls any pretilt angle thereof. It is not necessary to use a high voltage to transform the LC molecules from the splay state to the bend state when they are at a high pretilt angle. The external high voltage often causes the drawbacks of uneven displaying by incompletely or unduly slow splay to bend conversion.

The preferred embodiment of the present invention uses a single alignment film, such as a vertical alignment layer, sandwiched between the top substrate and the bottom substrate, adjusting the density of the side chains by a surface treating step for generating a stable alignment film of the liquid crystal molecules with a high pretilt angle. The vertical alignment layer processes the surface treatment via the particle beam using ions or plasma. After the step of orientating the alignment direction, the liquid crystal device is fabricated to implement a fast response LCD, i.e OCB. The scheme using the particle beam mentioned above can precisely control the energy, quantity, incident angle, or even the types of the beam. Thereby the density and proportion of the side chains of the alignment film can be changed to affect the pretilt angle of the LC molecules. Specifically, the present invention can obtain a pretilt angle from 5 to about 85 degree, depends on the extent of the surface treating step.

For achieving a specific pretilt angle needless of an external voltage for splay to bend transformation as in the conventional art, the particle beam using plasma or ions is used to treat the surface of the alignment film to reach the high pretilt angle of the LC molecules of the present invention. The above-mentioned scheme not only eliminates the step of converting LC molecules from the splay state to the bend state, but also causes the LC molecules to have a stable bend state for increasing the response of the LCD.

Figure 5:
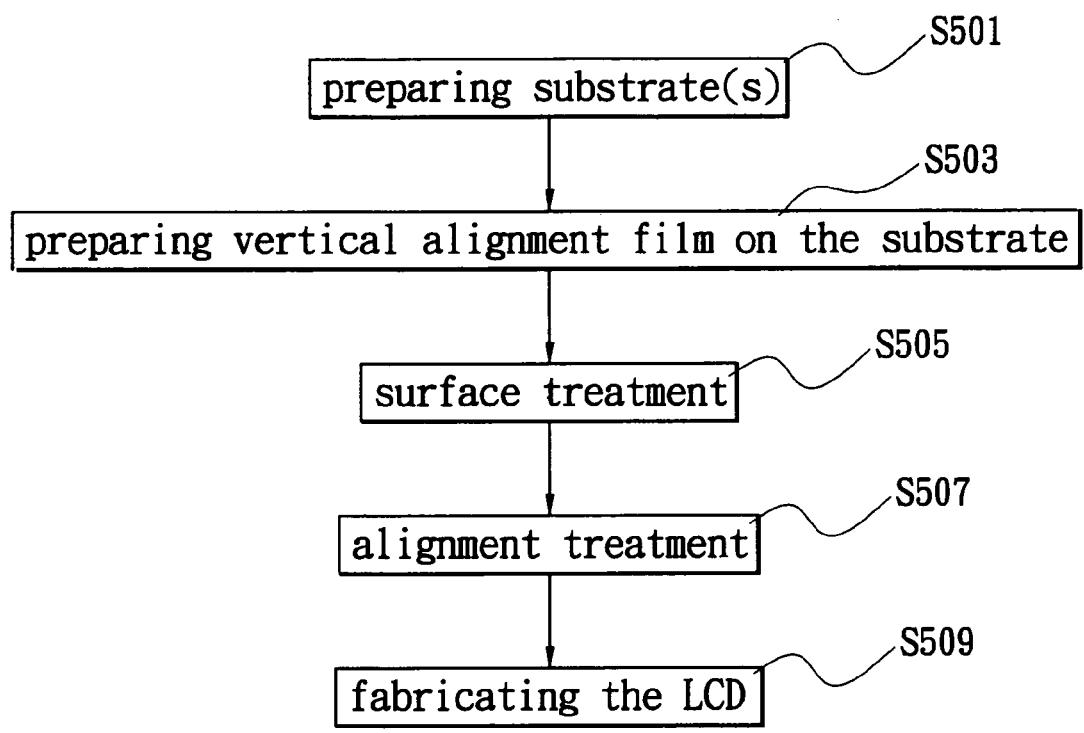
FIG. 5 is a flow chart of the steps for controlling the pretilt angle of LC molecules of the present invention.

FIG. 5 is a flowchart showing the steps of controlling the pretilt angle of the LC molecules. Firstly, a vertical alignment film of the LCD substrate is prepared. The substrate includes a top substrate and a bottom substrate (step S501). Next, an alignment film is formed on at least one of the substrates, wherein the material of the alignment film can be an organic or inorganic film, and the major compound of the organic film is polymide and the major material for the inorganic film is F-DLC (step S503). After the surface treatment of the alignment film is processed via the particle beam generated by ions or plasma (step S505), the density or distribution of the side chains of the alignment film is changed because of the bombardment of the particle beam, and finally, the alignment film surface energy is changed.

Next, the vertical alignment film is treated with an alignment step for producing surface anisotropy after the surface treatment. In the preferred embodiment, after the surface treatment of the vertical alignment film, a polar alignment is accomplished. Next, a step of roller rubbing is used for the alignment in an azimuthal direction.

The step of treating the surface is performed before the step of alignment mentioned above. The step of the alignment can be performed before the step of treating the surface in another embodiment. The proportion of the vertical alignment and the horizontal alignment of the LC molecules are determined by the above-mentioned surface treatment of the vertical alignment film, so as to control the pretilt angle of the LC molecules.

Consequently, the top substrate and the bottom substrate are assembled together, and the liquid crystal is injected for fabricating the LCD. The preferred embodiment of the present invention provides the OCB liquid crystal panel (step S509).

The aforementioned particle beam performs the surface treatment to control the density of the side chains by controlling some particle beam parameters. The pretilt angle of the LC molecules is then controlled. The particle beam can be used to control the surface energy of the alignment film precisely, and the incident angle thereof can be a vertical or an oblique angle. Since the particles generated from the ionic beam or the plasma beam only reach the surface of the alignment film, the effective depth of the surface treatment of the present invention is shallower than the depth of the surface treatment using light of the conventional art. Therefore, it s not easy to have unstable electric or thermal problems.

The particle beam of the preferred embodiment ranges between 50 eV and 3000 eV, and the compound of the particles is one of hydrogen ion, nitrogen ion, oxygen ion, fluorine ion, and argon ion, or a combination of hydrogen ion, nitrogen ion, oxygen ion, fluorine ion or argon ion. However, the compound of the particle beam is not limited to the above mention. The material of the substrate includes glass, plastic, flexible material and metal. The implementation is not limited in this embodiment.

Figure 6A:
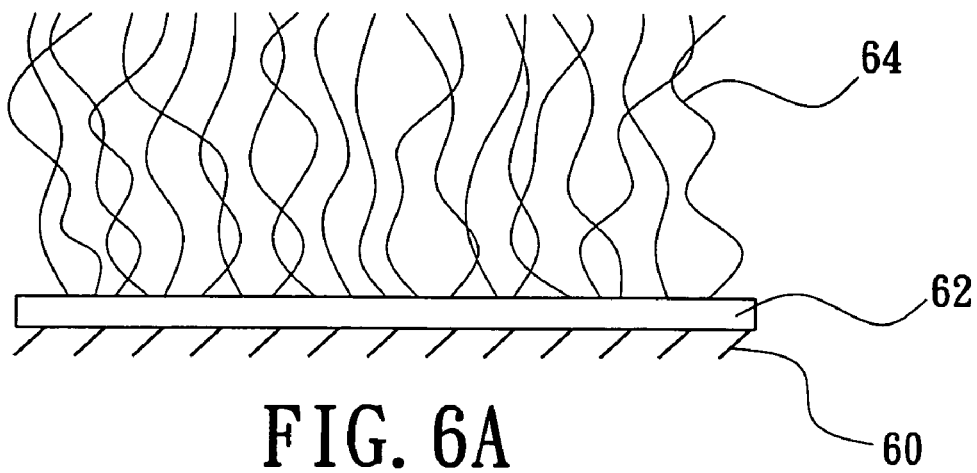
FIG. 6A to FIG. 6C are the schematic diagrams of the ionic beam collides with the side chains of the vertical alignment film in the present invention.
Figure 6B:
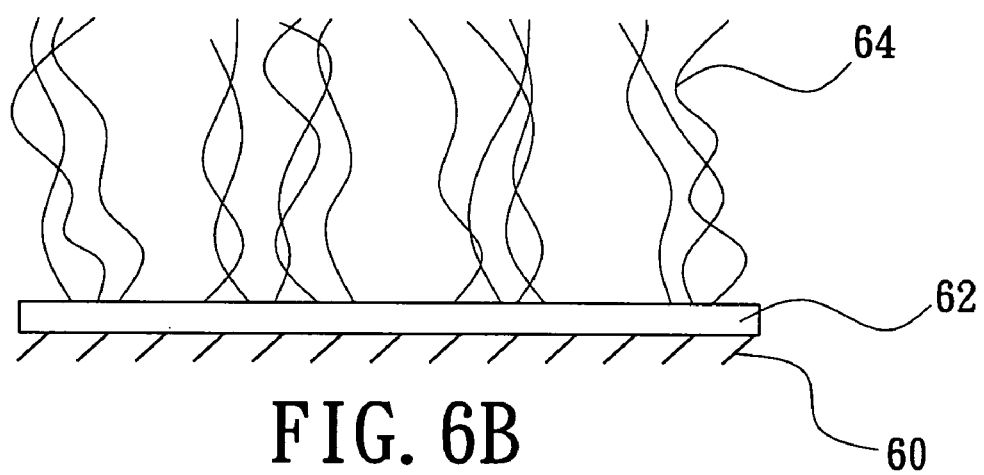
Figure 6C:
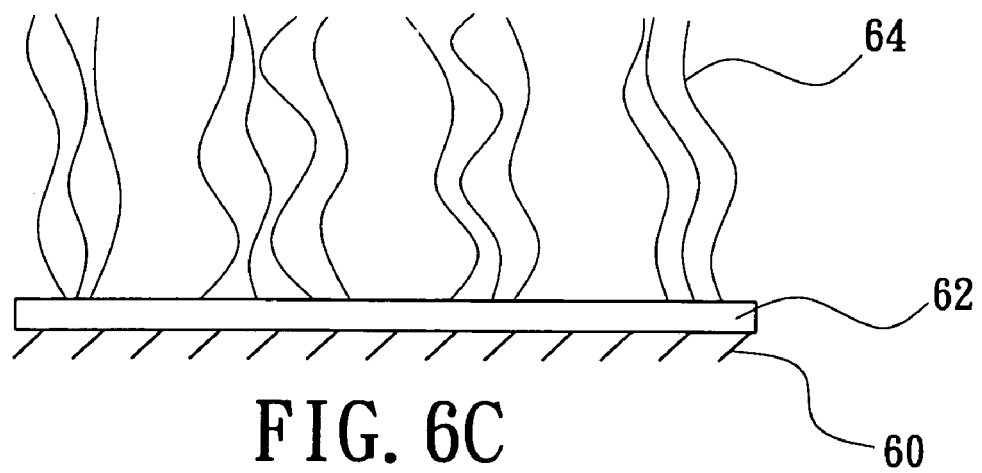

FIGS. 6A to 6C show the schematic diagrams of the particle beam impacting the side chains of the vertical alignment film. FIG. 6A shows a part of the LCD structure, which includes a substrate 60, and an alignment film 62 formed thereon, and a side chain structure 64 formed on the alignment film 62. The side chains of the alignment film in FIG. 6A are in an initial state. After that, the particle beam impacts the alignment film 62 and the side chain structure 64 thereof for breaking the structure of the side chains and changing their density. FIG. 6B shows part of the side chain structure 64 disappearing. After the step of orientation, a regular status of the side chains is formed and shown in FIG. 6C. The broken part of the side chains forms a horizontal alignment region, and the rest forms a vertical alignment region. Therefore, the liquid crystal molecules can be aligned along the side chain structure 64 for achieving a moderate high pretilt angle alignment. Particularly, the LC molecules having a high pretilt angle of the present invention are provided.

Figure 7:
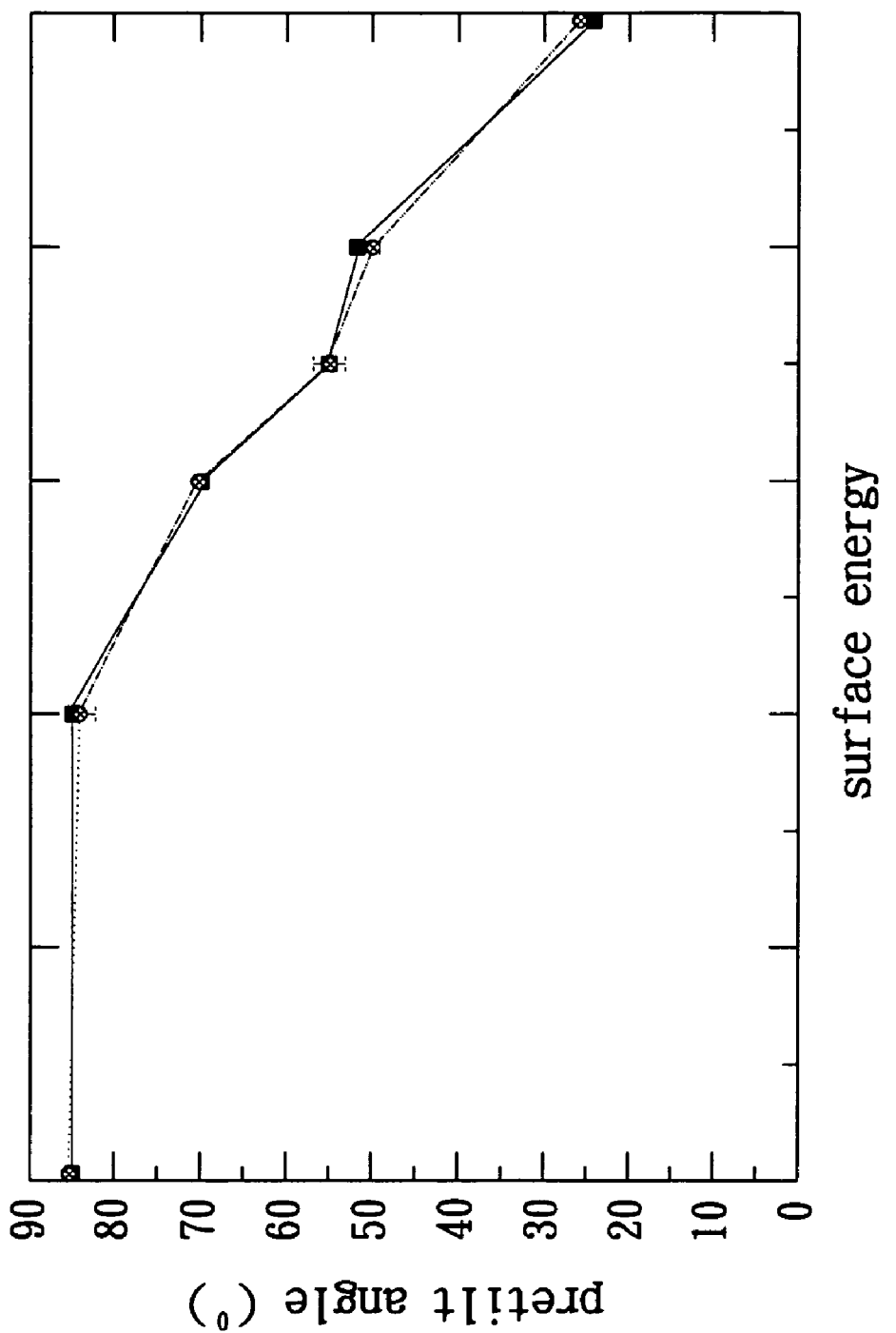
FIG. 7 shows the distribution of the surface energy and the pretilt angle of the alignment film from the experimental result.

FIG. 7 shows an experimental result of the surface energy and the pretilt angle after the surface treatment by the particle beam. The particle beam can be controlled to change the surface energy of the alignment film for controlling the density of the side chains thereof, so as to control the pretilt angle of the LC molecules. From the experiment result, the method disclosed in the present invention provides a pretilt angle ranging between 20 degree and 80 degree.

FIG. 8 is the experimental result of this invention under different extent of particle beam exposure. The method uses a step of rubbing to control the alignment, and another step of utilizing the particle beam to perform the surface treatment. According to the experiment, the dosage of the particle beam can be adjusted to control the various pretilt angles. In the preferred embodiment of the present invention, the pretilt angle of the LC molecules ranges between 20 and 80 degrees, and the surface energy generated from the particle beam (or ionic beam) ranges between 50 eV and 3000 eV (electron volt). Furthermore, the major components of the particle beam contain one or the combination of the ions having hydrogen ion, nitrogen ion, oxygen ion, fluorine ion, or argon ion. The experiment result as follows:

(1) With surface treatment by means of the step of rubbing (#1) but without any particle beam (ionic beam is employed in the present experiment), the pretilt angle is 84.5109 degree;

(2) With surface treatment by means of the step of rubbing and ionic beam, wherein the energy of the ionic beam is 250 eV, the dosage is $2 \times 10^{13}$ for each unit area, and the incident angle is 89 degree (#2), the pretilt angle is 79.0144 degree;

(3) With surface treatment by means of the step of rubbing and ionic beam, wherein the energy of the ionic beam is 250 eV, the dosage is $3 \times 10^{13}$ for each unit area, and the incident angle is 89 degree (#3), the pretilt angle is 71.4985 degree;

(4) With surface treatment by means of the step of rubbing and ionic beam, wherein the energy of the ionic beam is 250 eV, the dosage is $3.5 \times 10^{13}$ for each area unit, and the incident angle is 89 degree (#4), the pretilt angle is 54.7536 degree;

(5) With surface treatment by means of the step of rubbing and ionic beam, wherein the energy of the ionic beam is 250 eV, the dosage is $4\times10^{13}$ for each area unit, and the incident angle is 89 degree (#5), the pretilt angle is 47.5049 degree;

(6) With surface treatment by means of the step of rubbing and ionic beam, wherein the energy of the ionic beam is 250 eV, the dosage is $5\times10^{13}$ for each area unit, and the incident angle is 89 degree (#6), the pretilt angle is 24.1674 degree.

To sum up, the method for controlling the pretilt angle of the LC molecules of the present invention uses a particle beam, such as an ionic beam or a plasma beam, to treat the surface of the alignment film by impacting the film and side chains. After the surface treatment, the density of the side chains is changed in response to the conditions of the particle beam or gas therein, so as to change the density and distribution. Therefore, the pretilt angle of the LC molecules in the surface of alignment film is determined.

The many features and advantages of the present invention are apparent from the written description above and it is intended by the appended claims to cover all. Furthermore, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A manufacturing method of a liquid crystal device, comprising:
   preparing at least two substrates, each substrate having at least an organic or inorganic vertical alignment film of the liquid crystal device;
   processing a surface treatment on the vertical alignment film with a particle beam, so as to change a side chain density and distribution by means of the particle beam colliding with the vertical alignment film, wherein the surface treatment generates a stable alignment film of the liquid crystal molecules with a high pretilt angle;
   aligning the surface of the vertical alignment film to enhance surface anisotropy for liquid crystal molecule alignment; and
   fabricating opposite substrates to form the liquid crystal device, wherein a liquid crystal layer is sandwiched between the opposite substrates.

2. The method as recited in claim 1, wherein the surface treatment of the alignment film determines the ratio of the vertical alignment regions and horizontal alignment regions of the alignment film, so as to control the pretilt angle of the liquid crystal molecules.

3. The method as recited in claim 1, wherein the particle beam is generated by ions.

4. The method as recited in claim 1, wherein the particle beam is generated by plasma.

5. The method as recited in claim 1, wherein the step of the surface treatment is performed before the step of alignment.

6. The method as recited in claim 1, wherein the step of aligning the vertical alignment film is performed before the step of the surface treatment.

7. The method as recited in claim 1, wherein the step of alignment operates as the step of the surface treatment is operating simultaneously.

8. The method as recited in claim 1, wherein the pretilt angle of the liquid crystal molecules is controlled by controlling energy, quantity, incident angle or ions types of the particle beam at the step of treating the surface.

9. The method as recited in claim 8, wherein the step of the surface treatment is performed to control surface energy of the alignment film.

10. The method as recited in claim 1, wherein an alignment aligning the surface of the vertical alignment film is selected from a group comprising a rubbing alignment, a photo-alignment, an ion beam alignment, and a plasma alignment.

11. The method as recited in claim 1, wherein the particle beam collides with the alignment film from a vertical direction or an oblique direction.

12. The method as recited in claim 1, wherein the substrate is a glass substrate, a plastic substrate, a flexible substrate or a metal foil substrate.

13. The method as recited in claim 1, wherein the method controls the pretilt angle from 5 to 85 degrees.

14. The method as recited in claim 1, wherein an energy of the particle beam ranges from 50 eV to 3000 eV.

15. The method as recited in claim 1, wherein a compound of the particle beam is one of hydrogen ion, nitrogen ion, oxygen ion, fluorine ion, and argon ion.

16. The method as recited in claim 1, wherein a compound of the particle beam is a combination of hydrogen ion, nitrogen ion, oxygen ion, fluorine ion or argon ion.

17. A manufacturing method of a liquid crystal device, comprising:
   preparing at least two substrates, each substrate having an organic or inorganic vertical alignment film of the liquid crystal device;
   preparing a liquid crystal layer sandwiched between the substrates, wherein the liquid crystal layer is an optically compensated birefringence (OGB) mode liquid crystal layer;
   processing a surface treatment on the vertical alignment film with a particle beam, so as to change a side chain density and distribution by means of the particle beam colliding with the vertical alignment film, and to generate a stable alignment film of the liquid crystal molecules with a high pretilt angle;
   aligning the surface of the vertical alignment film to enhance surface anisotropy for liquid crystal molecule alignment; and
   fabricating opposite substrates to form the liquid crystal device.

* * * * *